United States Patent
Hopwood et al.

(10) Patent No.: US 6,697,148 B1
(45) Date of Patent: Feb. 24, 2004

(54) OPTICAL RADAR WITH RANGE AND DOPPLER MEASUREMENT CAPABILITY

(76) Inventors: Francis W. Hopwood, 124 Sherburn Rd., Severna Park, MD (US) 21146; John H. Glezen, 4921 Jewell Ter., Palm Harbor, FL (US) 34685

( * ) Notice: Subject to any disclaimer, the term of this patent is extended or adjusted under 35 U.S.C. 154(b) by 0 days.

(21) Appl. No.: 10/075,365

(22) Filed: Feb. 15, 2002

(51) Int. Cl.$^7$ .............................. G01C 3/08; G01P 3/36

(52) U.S. Cl. .................................. 356/28.5; 356/5.09

(58) Field of Search ............................. 356/5.09, 28.5

(56) References Cited

U.S. PATENT DOCUMENTS

| | | | | |
|---|---|---|---|---|
| 4,611,912 A | * | 9/1986 | Falk et al. ................ | 356/28.5 |
| 4,743,110 A | * | 5/1988 | Arnaud et al. | |
| 4,846,571 A | * | 7/1989 | Jelalian et al. | |
| 4,893,923 A | * | 1/1990 | Javan | |
| 4,960,329 A | * | 10/1990 | Schofield | |
| 5,867,257 A | * | 2/1999 | Rice et al. ................ | 356/285 |
| 6,133,993 A | * | 10/2000 | Labaar ..................... | 356/5.09 |
| 6,208,285 B1 | | 3/2001 | Burkhardt | |

OTHER PUBLICATIONS

United States Statutory Invention Registration, Linear Frequency Modulation Apparatus and Tecnique, Mosser et al., Reg. No. H1, 797, S.N. 06/553,902, filed Nov. 21, 1983, Published Jul. 6, 1999.

"Ultrahigh–Sensitivity Self–Mixing Laser Doppler Velocimetry with Laser–Diode–Pumped Microchip LiNdP4012 Lasers", IEEE Photonics Tech. Let., vol. 11, No. 6, Jun., 1999, Kawai et al.

"Optically Coherent Direct Modulated FM Analog Link with Phase Noise Canceling Circuit", Journal of Lightwave Tech., vol. 17, No. 4, Apr., 1999, R. Taylor et al.

"Coherent FM–SCM System Using DFB Lasers and a Phase Noise Cancellation Circuit", IEEE Photonics Technology Letters, vol. 2, No. 1, Jan., 1990, R. Gross et al.

"Coherent Subcarrier Fiber–Optic Communication Systems with Phase–Noise Cancellation", IEEE Transactions On Communications, vol. 42, No. 6, Jun., 1994, W.C. Kwong et al.

"The Electrical Engineering Handbook", Chapter 30, 1993, pp. 763–769, R. Dorf.

"The Electrical Engineering Handbook", Chapter 39, 1993, pp. 958–970, R. Dorf.

* cited by examiner

Primary Examiner—Stephen C. Buczinski
(74) Attorney, Agent, or Firm—Birch, Stewart, Kolasch & Birch, LLP

(57) ABSTRACT

A laser radar system is disclosed. The laser radar system includes a transmitting means that transmits a signal. The transmitted signal is formed by an optical signal that is amplitude modulated with a source signal thereby forming a transmitted signal having light packets at a repetition rate of the source signal. A receiving means that receives the transmitted signal after it is reflected from an object. A Doppler processor determines the Doppler frequency shift of the source signal from signals derived from the reflected signal.

18 Claims, 2 Drawing Sheets

OPTICAL RADAR WITH RANGE AND DOPPLER MEASUREMENT CAPABILITY

BACKGROUND OF THE INVENTION

1. Field of the Invention

This invention relates generally radar and range measurement systems and in particular to optical radar systems.

2. Description of Related Art

Conventional laser radar systems have several advantages over microwave radar systems. The primary advantage of this kind of radar is its very narrow beam width. This narrow beam width enables long-range performance with moderate transmit power. Conventional laser radar systems use techniques that are analogous to early rudimentary microwave systems. Conventional laser radar systems use short pulses to achieve fine range resolution, which limits range resolution as well as average power. Another drawback of conventional laser radar systems is the unsatisfactory way in which it deals with Doppler shifts.

Coherent optical detection is accomplished by mixing the incoming beam with a duplicate via a beam splitter. The Doppler shift appears in the beat frequency of the output of the beam splitter. However, coherent laser processing has two problems.

First, the Doppler frequencies for laser signals are many orders of magnitude higher than the Doppler frequencies for microwave signals. In applications of optical velocimetry to date initiated by the communications industry, all the emphasis has been on sensitivity issues rather than bandwidth issues (see, e.g., Kawai et al., "Ultrahigh-Sensitivity Self-Mixing Laser Doppler Velocimetry with Laser-Diode-Pumped Microchip LiNdP4O12 Lasers", IEEE Photonics Tech. Let., Col. 11, No. 6, June 1999, which is incorporated herein by reference in its entirety). There has been more interest in the industry for the detection of small numbers of photons than there has been to accurately measure the speed of a detected object. Consequently, there has been little research done of interest to radar researchers and the radar art.

A second problem with laser radar is the phase noise of laser devices. Phase noise cancellation has been the subject of some recent research, again in the communications industry. However, it is still a formidable problem. Examples of research in this area include articles by Taylor, R., and Forrest, S., "Optically Coherent Direct Modulated FM Analog Link with Phase Noise Cancelling Circuit", J. Lightwave Tech., Vol. 17, No. 4, April 1999; Gross, R., Olshansky, R., and Schmidt, M., "Coherent FM-SCM System Using DFB Lasers and a Phase Noise Cancellation Circuit", IEEE Photonics Letters, Vol. 2, No. 1, January 1990; and Kwong, W., Prucnal, P., and Teich, M., "Coherent Subcarrier Fiber-Optic Communication Systems with Phase-noise Cancellation", IEEE Transactions on Comm., Vol. 42, No. 6, June 1994. Each of the above-identified references is incorporated herein by reference in its entirety.

Fortunately, with the advent of very high-speed modulators, some aspects of modern microwave radar are now applicable to laser radar. A comparison between modern microwave radar, and modern laser radar is provided in the following table:

TABLE 1

| | Equivalent Microwave (X-Band) Linear FM Radar | IR (800 nm) Laser Radar |
|---|---|---|
| 1.5 m Range Resolution | 100 MHz Bandwidth | 10 nsec pulse |
| 0.075 m Range Resolution | 2000 MHz Bandwidth | 0.5 nsec pulse |
| Duty cycle | 0.20 | $10^{-5}$ |
| Peak Power | 3 kW | 50 MW |
| 2-way Doppler of 100 m/s object | 6.7 kHz | 250 MHz |

Table 1

Table 1 is a comparison between microwave radar and infrared (IR) laser radar. This table shows clearly the difference in duty cycle and Doppler shifts as measured by the two systems. Several of the design implications as a result of these characteristics on laser radar systems are discussed in the following section. Those skilled in the art will appreciate that the peak power of radar is the average power divided by the duty cycle. Thus, for microwave radar, the peak power is greater than the average power by a factor of 5. For the laser the difference is a factor of $10^5$, thereby placing a very high power requirement on the laser. The contrast is even starker in relation to Doppler processing. Because of the poor short-term stability of a laser coupled with the 5+ order of magnitude, the difference between laser Doppler and microwave Doppler effectively precludes lasers from tasks requiring range-rate information. Since the vast majority of radar applications either require Doppler processing or would greatly benefit from it, the implications of this drawback significantly undermines the use of lasers in radar systems.

SUMMARY

Accordingly, it is an object of the present invention to provide an improvement in laser radar systems.

It is yet another object of the invention to provide a laser radar, that has the benefits of microwave radar, along with the benefits of laser radar.

The foregoing and other objects are achieved by a method of implementing a laser radar, the method comprising: amplitude modulating a laser beam with a source signal; transmitting a signal comprising light packets at a repetition rate of the source signal, wherein the transmitted signal is generated from amplitude modulating the laser beam; receiving a reflected signal that is a reflection of the transmitted signal; and determining a Doppler frequency shift from signal properties of the reflected signal.

Further, the foregoing and other objects are achieved by a laser radar system comprising: a transmitter that transmits a signal, wherein the transmitted signal is formed by an optical signal that is amplitude modulated with a source signal, the transmitted signal comprising light packets at a repetition rate of the source signal; a receiver that receives a reflected signal that is a reflection of the transmitted signal; and a Doppler processor that determines the Doppler frequency shift of the source signal from signals derived from the reflected signal.

Further scope of applicability of the present invention will become apparent from the detailed description provided hereinafter. It should be understood, however, that the detailed description and specific embodiments, while disclosing the preferred embodiments of the invention, are provided by way of illustration only inasmuch as various changes and modifications coming within the spirit and scope of the invention will become apparent to those skilled in the art from the detailed description which follows.

BRIEF DESCRIPTION OF THE DRAWINGS

The present invention will become more fully understood when the following detailed description is considered in conjunction with the accompanying drawings, which are provided by way of illustration only, and thus are not meant to be limitative of the present invention, and wherein.

DESCRIPTION OF THE PREFERRED EMBODIMENTS

Figure 1:
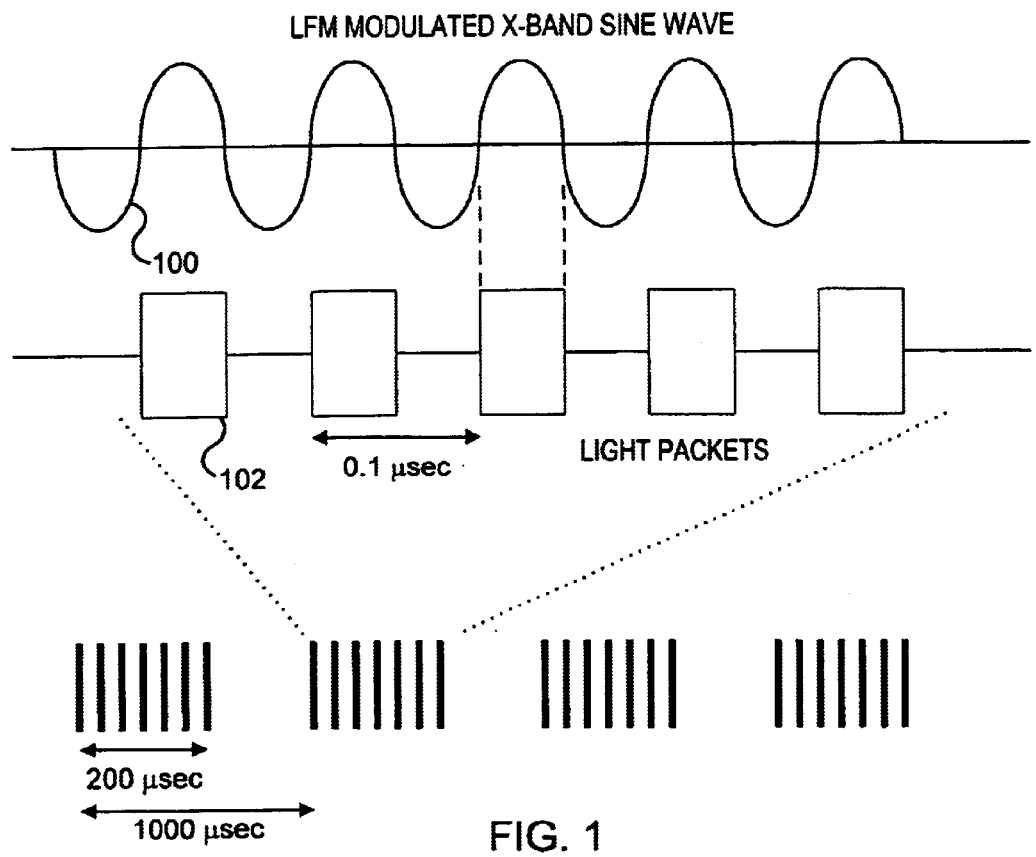
FIG. 1 is illustrative of waveforms of a laser radar system of the present invention.

One way microwave radar achieves range resolution is via direct Linear Frequency Modulation (LFM) of the transmitted carrier. This type of modulation is efficiently and easily achieved at microwave frequencies. However, it is difficult for high power laser sources to achieve this type of modulation. It is possible, with some loss in efficiency, to achieve the same result by amplitude modulating the laser beams with a microwave signal that carries the desired LFM modulation. Therefore, the LFM microwave signal is used to amplitude modulate the laser, rather than the carrier being modulated with the LFM. Therefore, the laser transmits light packets whose repetition rate is that of the microwave source. Thus, the undesirable phase and Doppler characteristics of the optical signal disappear entirely and are replaced with those of the RF modulation, which are more easily controlled. This method effectively shifts the level of the modulation from the carrier to the pulse frequency. However, the narrow beam width of the laser is still in effect, as shown in FIG. 1.

Figure 2:
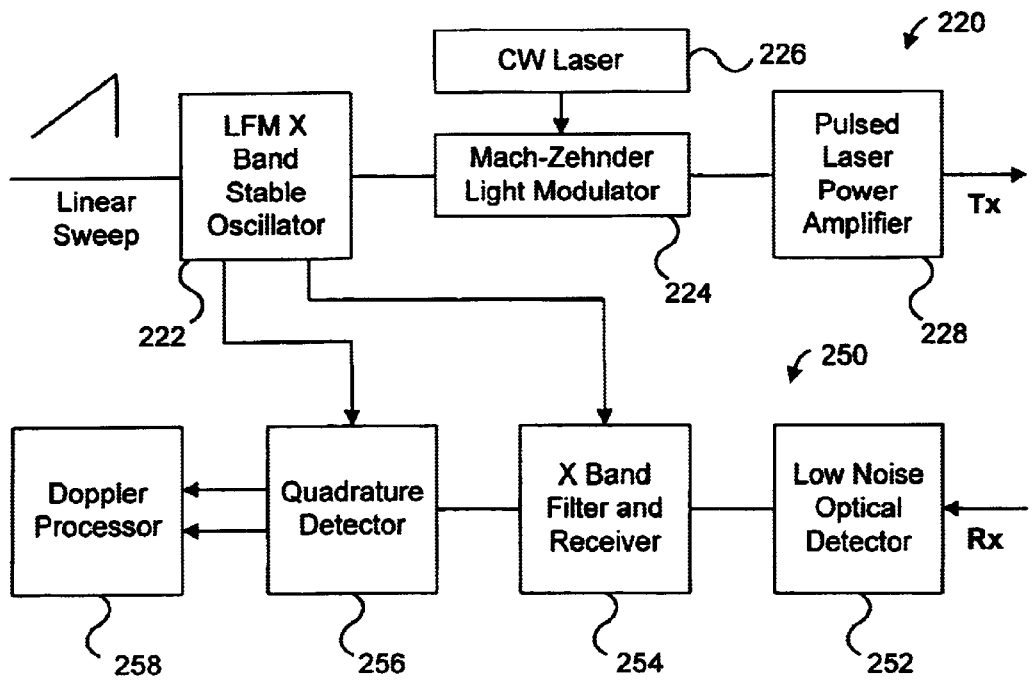
FIG. 2 is a block diagram of a laser radar system according to an embodiment of the present invention.

FIG. 2 shows a block diagram of an embodiment of the present invention. A transmitter 220 and a receiver 250 are shown. Those skilled in the art will appreciate that there can be many variations of the transmitter 220 and receiver 250, without departing form the teachings of the present invention. For example, the laser can be amplitude modulated by an X-band microwave carrier, or any other carrier deemed suitable. In block 222, the X-band microwave carrier is frequency modulated by a LFM waveform. Generating X-band LMF waveforms is well known in the art. An example of generating a LMF waveform is described in U.S. Statutory Invention Registration No. H1,767, which is incorporated herein by reference in its entirety. The LMF waveform is used to drive a light modulator in block 224. The modulator can be a Mach-Zehnder light modulator, or any other suitable modulator, which will be appreciated by those skilled in the art. The Mach-Zehnder modulator is well known in the art and is described in pages 763–769 of Dorf. R., "The Electrical Engineering Handbook", Chapter 30, 1993, which is incorporated herein by reference in its entirety. As shown in FIG. 2, the light modulator 224 comprises a Mach-Zehnder light modulator and amplitude modulates the output from a continuous wave (CW) laser source from block 226 with a linear frequency modulated (LFM) X-band sine wave 100 shown in FIG. 1 from the X-band oscillator 222. Then, the modulated laser tone (FIG. 3) outputted from the light modulator 224 is amplified in block 228 which is shown in FIG. 2 to be a pulsed laser power amplifier. The output of the pulsed laser power amplifier 228 is transmitted in the form of light packets, shown in FIG. 1 by reference numeral 102, and reflected by an object (not shown).

The return signal is amplitude detected, in block 252, via a low noise optical detector. Block 254 then filters for X-band carrier and amplifies the output of block 252. Then, the signal is mixed with the original X-band signal, and a quadrature detector separates the mixed signal as is well known in the art, in block 256. The resulting signals from the quadrature detector are processed in the Doppler processor, in block 258 to determine the Doppler frequency shift. However, as those skilled in the art will appreciate, the Doppler frequency shift is that of the X-band signal, not the optical signal. Therefore, the radar system of the present invention has the Doppler processing properties and stability requirements of an X-band radar system. The Doppler frequency shift can be used in a conventional manner to determine information about an object, such as velocity and the like. Doppler processing is well known in the art and will not be described further herein. Examples of Doppler processing are described in pages 958–970 of Dorf. R., "The Electrical Engineering Handbook", Chapter 39, 1993, which is incorporated herein by reference in its entirety and U.S. Pat. No. 6,208,288, which is also incorporated herein by reference in its entirety.

Phase coherence properties of the optical source, often a major concern for optical systems, are irrelevant because there is no coherent detection of the optical signal. As described above, it is actually the coherence properties of the X-band carrier that are used to implement a radar system according an embodiment of the present invention.

In view of the foregoing description and with particular reference to FIGS. 1 and 2, a method of implementing a laser radar according to the present invention will be apparent to those skilled in the art. The method comprises amplitude modulating a laser beam with a source signal. For example, the source signal is at a microwave frequency and is linear frequency modulated. A signal comprising light packets having a repetition rate of the source signal is transmitted, wherein the transmitted signal is generated from amplitude modulating the laser beam. A reflected signal is received that is reflection of the transmitted signal. Then, the Doppler frequency shift is determined from signal properties of the reflected signal.

As noted above in regard to the laser radar system, many alternative components can be used to practice the method. For example, the amplitude modulation can be performed by a Mach-Zehnder light modulator. The mixing can be performed in a quadrature detector that supplies the signals to a Doppler processor for the Doppler frequency shift determination. Those skilled in the art will appreciate that the various functions referred to herein refers to any combination of hardware, software and or combinations of hardware and software to implement the associated function. For example the Doppler processor can be a discrete signal processor, application specific integrated circuit, and the like with associated logic/software to perform the necessary functions. Alternatively, the Doppler processor can be a functional block of software that performs the desired function as part of a larger general purpose processing platform that may include other functions of the receiver, such as filtering, mixing, and the like.

Further, additional steps can be added to the method described above as will be apparent from the foregoing description. For example, the method can further comprise amplifying the signal to be transmitted prior to transmitting the signal. Upon reception the reflected signal can be amplitude detected. The reflected signal can be filtered for the source signal. Then, the filtered signal can be mixed with the source signal to generate signals for the Doppler frequency shift determination. Many alternative steps can be added or substituted without departing from the teachings of the present invention.

Figure 3:
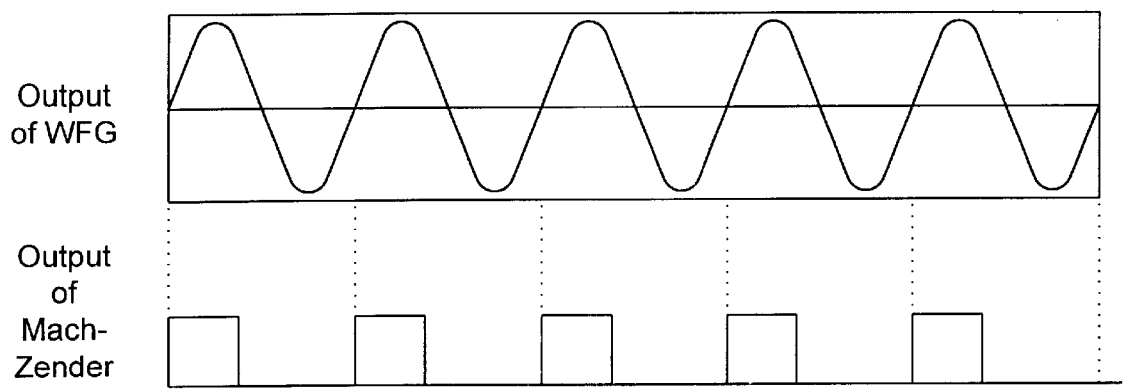
FIG. 3 is illustrative of output waveforms of a laser radar system of the present invention.
Figure 4:
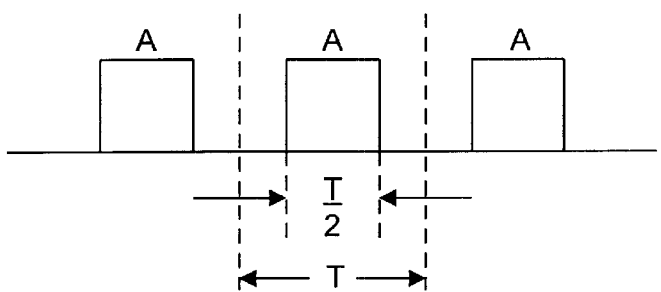
FIG. 4 is illustrative of a pulse train of a laser radar system of the present invention.

To evaluate the efficiency of a laser radar system according to the present invention, a slightly simplified version of a laser radar modulated by a single X-Band tone is analyzed. This results in a pulse train of light with a fifty-percent duty cycle, as shown in FIG. 3. The total power of the pulse train can be determined as shown in FIG. 4 and as follows. After amplitude modulation, the useful information comes from the first side lobes, given as:

$$c_1 = c_{-1} = \frac{A}{2}\left(\frac{2}{\pi}\right)$$

The useful side-band power is therefore given as:

$$P_{sb} = (c_1)^2 + (c_{-1})^2 = \frac{A^2}{4}\left[\left(\frac{2}{\pi}\right)^2 + \left(\frac{2}{\pi}\right)^2\right] = \frac{A^2}{4} \cdot \frac{8}{\pi^2} = \frac{2}{\pi^2} \cdot A^2$$

Thus, the efficiency is given as:

$$\eta = \frac{P_{sb}}{P_{tot}} = \frac{A^2 \cdot \frac{2}{\pi^2}}{A^2 \cdot \frac{1}{2}} = \frac{4}{\pi^2} = 40\%$$

The present invention can use standard components such as the WaveStar™ ADM 40G Lucent Technologies, Inc., which is a fast single-laser optical transmission system. The WaveStar™ ADM 40G system is capable of delivering 40 gigabits per second (Gb/s) of capacity with a single laser over a single wavelength on a single fiber-optic cable, making it four times faster than typical commercially available single-laser systems. Conventional direct detectors such as the Electron Tubes, Inc. P30RS232 photomultiplier with six decades of dynamic range can also be used in the present invention. This device can detect from 10 to $10^8$ photons per second and can interface with a computer via a RS-232 cable. The system according to the present invention can achieve efficiencies of 40% due to amplitude modulation, as shown in the above equations.

The pulse-compression has been described as LFM. However, those skilled in the art will appreciate that the invention is not limited to LFM. Additionally, the transmitting and receiving circuits can be configured in any known manner and comprised of other components then outlined above. For example, alternative laser sources modulators and optical detectors can be selected based on the specific laser radar system requirements, as will be appreciated by those skilled in the art.

Accordingly, the foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method of implementing a laser radar, comprising the steps of:
   amplitude modulating a laser beam with a linear frequency modulated microwave source signal and forming thereby a pulse train of light packets of the laser beam at a repetition rate of the source signal;
   transmitting the pulse train of light packets to an object;
   receiving a reflected signal from the object that is a reflection of the transmitted light packets; and
   determining a Doppler frequency shift of the microwave source signal from signal properties of the reflected signal.

2. The method of claim 1, wherein the amplitude modulation of the laser beam is performed by a Mach-Zehnder light modulator.

3. The method of claim 1, wherein the microwave source signal is an X-band microwave carrier.

4. The method of claim 1, further comprising the steps of:
   amplitude detecting the reflected signal;
   filtering the reflected signal for the microwave source signal; and
   mixing the filtered signal with the microwave source signal to generate signals for a determination of Doppler frequency shift of the microwave source signal.

5. The method of claim 4, wherein the mixing is performed in a quadrature detector that supplies the signals to a Doppler processor for the Doppler frequency shift determination.

6. A laser radar system comprising:
   a transmitter that transmits a laser output signal comprising a pulse train of light packets formed by a laser signal that is amplitude modulated with a linear frequency modulated microwave source signal having a predetermined repetition rate, and wherein the light packets have a repetition rate corresponding to the repetition rate of the source signal;
   a receiver that receives a reflected signal that is a reflection of the transmitted laser output signal; and
   a Doppler processor that determines a Doppler frequency shift of the microwave source signal from signals derived from the reflected signal.

7. The laser radar system of claim 6, further comprising:
   a source of a linear sawtooth voltage waveform of said predetermined repetition rate;
   an oscillator linearly frequency modulated by the sawtooth voltage waveform that generates the microwave source signal;
   a light modulator that amplitude modulates the optical signal in response to the linearly frequency modulated source signal so as to form said light packets; and
   a power amplifier that amplifies the light packets prior to being transmitted.

8. The laser radar system of claim 7, wherein the laser output signal is generated by single-laser optical system.

9. The laser radar system of claim 8, wherein the microwave source signal is at an X-band frequency.

10. The laser radar system of claim 7, wherein the laser output signal is generated by single-laser optical system and the light modulator forms a pulse train of light packets having a fifty percent duty cycle.

11. The laser radar system of claim 10, wherein the microwave source signal is an X-band frequency signal.

12. The laser radar system of claim 7, further comprising:
    a low noise optical detector that detects an amplitude envelope of the reflected signal;

a filter that filters the detected amplitude envelope of the microwave source signal; and a mixer that mixes the filtered signal with the microwave source signal.

13. The laser radar system of claim 12, wherein the mixer is part of a quadrature detector that supplies signals to the Doppler processor.

14. An optical radar system comprising:

a transmitter that transmits a pulse train of optical signals comprising:

an oscillator that generates a linear frequency modulated microwave source signal, having a predetermined repetition rate, in response to a modulation signal;

a light modulator that amplitude modulates an optical signal from an optical signal source with the linear frequency modulated source signal so as to generate a pulse train of optical signals; and an amplifier that amplifies the pulse train of optical signals prior to being transmitted, wherein the optical signals comprises light packets having a repetition rate equal to the repetition rate of the source signal; and a receiver that receives a reflected signal, wherein the reflected signal comprises the transmitted optical signals reflected from an object, the receiver comprising:

an optical detector that detects the reflected optical signals;

a filter that filters the detected optical signals;

circuit means that mixes the detected optical signals with the linear frequency modulated source signal; and a Doppler processor that determines a Doppler frequency shift of the linear frequency modulated microwave source signal from signals derived from the optical signals, and wherein the Doppler frequency shift of the microwave source signal is used to determine a velocity of the object.

15. The optical radar system of claim 14, wherein the microwave source signal is linear frequency modulated by a sawtooth modulation signal having said predetermined repetition rate.

16. The optical radar system of claim 15, wherein the microwave source signal is an X-band frequency signal.

17. The optical radar system of claim 14 wherein the pulse train of optical signals comprises light packets having a fifty percent duty cycle.

18. The optical radar system of claim 14 wherein the circuit means that mixes comprises a quadrature detector.

* * * * *